(12) United States Patent
Inayoshi et al.

(10) Patent No.: US 7,658,125 B2
(45) Date of Patent: Feb. 9, 2010

(54) STEERING DEVICE

(75) Inventors: Hidetoshi Inayoshi, Nukata-gun (JP); Morito Oshita, Kariya (JP); Kazuhiro Maki, Chiryu (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 801 days.

(21) Appl. No.: 11/152,246

(22) Filed: Jun. 15, 2005

(65) Prior Publication Data

US 2005/0284251 A1    Dec. 29, 2005

(30) Foreign Application Priority Data

Jun. 25, 2004 (JP) ............................... 2004-187747

(51) Int. Cl.
*B62D 1/18* (2006.01)

(52) U.S. Cl. ........................................ 74/493; 280/775

(58) Field of Classification Search ................ 74/493; 280/775
See application file for complete search history.

(56) References Cited

U.S. PATENT DOCUMENTS

| | | | |
|---|---|---|---|
| 4,949,990 A | | 8/1990 | Hirahara et al. |
| 6,523,432 B1 * | | 2/2003 | Yamamoto et al. ............ 74/492 |
| 6,711,965 B2 | | 3/2004 | Tomaru et al. |
| 6,981,430 B2 * | | 1/2006 | Murakami et al. ............ 74/493 |
| 7,191,679 B2 | | 3/2007 | Tomaru et al. |
| 2002/0079685 A1 | | 6/2002 | Yoshimoto |
| 2006/0043720 A1 | | 3/2006 | Sawada et al. |

FOREIGN PATENT DOCUMENTS

| | | |
|---|---|---|
| EP | 1 561 669 A1 | 8/2005 |
| GB | 2 340 086 A | 2/2000 |
| JP | 61-47770 U | 3/1986 |
| JP | 2000-344112 A | 12/2000 |
| JP | 2001-18809 A | 1/2001 |
| JP | 2002-2503 A | 1/2002 |
| JP | 2002-193110 A | 7/2002 |
| JP | 2002-302046 A | 10/2002 |
| JP | 2004-58927 A | 2/2004 |
| KR | 1997-0005674 | 2/1997 |
| WO | 2004/0043766 A1 | 5/2004 |

OTHER PUBLICATIONS

European Search Report issued by the EPO in corresponding European Patent Application No. EP 05 01 2468, The Hague, The Netherlands.
Official Action issued on Nov. 11, 2008 in counterpart Korean application, and English language translation of Official Action.
Office Action dated Jun. 30, 2009 in corresponding Japanese Patent Application No. 2004-187747 and English translation.

* cited by examiner

*Primary Examiner*—William C Joyce
(74) *Attorney, Agent, or Firm*—Buchanan Ingersoll & Rooney PC (57) ABSTRACT

A steering device comprises a steering shaft to which a steering wheel is attached, a steering column for housing and supporting the steering shaft so as to be rotatable, a tilt unit for tilting the steering column and the steering shaft, a main bracket fixed to a vehicle side bracket and a pressure applying member provided between the main bracket and the steering column for applying a pressure in one direction to the steering column.

12 Claims, 5 Drawing Sheets

STEERING DEVICE

CROSS REFERENCE TO RELATED APPLICATIONS

This application is based on and claims priority under 35 U.S.C. §119 to Japanese Patent Application 2004-187747, filed on Jun. 25, 2004, the entire content of which is incorporated herein by reference.

FIELD OF THE INVENTION

The present invention relates to a steering device whose rigidity is improved.

BACKGROUND

A steering device mounted to a vehicle, such as an automobile, generally includes a steering shaft, which is supported by a steering column. Specifically, the steering shaft is connected at one end thereof to a steering wheel, and also connected at the other end thereof to a tire by means of an intermediate shaft or the like. In this circumstance, vibrations caused by rotations on an engine or a rough or bumpy load surface has been transmitted to the steering wheel by means of the steering shaft. To reduce the vibrations transmitted to the steering wheel as possible, the rigidity of the steering column has been enhanced.

A known steering device, disclosed in JP 2002-193110A, employs an electric tilt steering system and includes an electric tilt unit for tilting the steering column in a vertical direction, the steering column being connected to, for example, the vehicle steering wheel.

Such steering device further includes a column tube, the column tube being supported at a column tilting point so as to be tilted thereabout. Thus, when a driver operates a switch for adjusting the steering device, an angle of the steering column is adjusted by means of the electric tilt unit.

When the steering column is tilted, the column tube is slid in a vertical direction in a manner where a roughly triangular protruded shape of a sliding member of the column tube slides on a roughly triangular recessed shape of a contact portion (pressure pad) of the column tube. The contact portion is fastened to a housing, which is attached to the steering column, by means of a bolt so as to apply a pressure constantly to the column tube in a horizontal direction. Thus, by means of the bolt applying a pressure to the column tube, vibrations in a vertical direction or a horizontal direction of the steering column can be reduced.

In this configuration, even when a load is applied to the steering wheel in a vertical direction or a horizontal direction, vibrations in a vertical direction or a horizontal direction on the steering column can be reduced; as a result, rigidity of the steering column can be enhanced.

Specifically, according to the known steering device, when the pressure is applied in a right direction, because the pressure is also applied to the column tilting point, at which the steering column is tilted, or applied to the tilt unit, the vibrations on the steering column cannot be reduced adequately, as a result, the vibrations transmitted to the steering wheel cannot be reduced. Further, in this circumstance, load fluctuation may be easily generated, and rotations of the motor may become uneven, as a result, a level of the noise may be increased.

Further, because the column tube is fitted to the housing at the tilt unit side by means of a nut, and also fit to the housing at the contacting portion by the sliding member, when a large pressure is applied to the column tube at the steering wheel side in a vertical direction, the column tube may be disengaged from the sliding member so that the column tube may become unstable. Consequently, a rotational moment is applied to the fitting portion of the column tube at the tilt unit side; as a result, it becomes difficult to secure rigidity of the steering column.

Thus, a need exist for the steering device to improve rigidity of the steering column in order to reduce vibrations from transmitting to the steering wheel.

SUMMARY OF THE INVENTION

According to an aspect of the present invention, a steering device comprises a steering shaft to which a steering wheel is attached, a steering column for housing and supporting the steering shaft so as to be rotatable, a tilt unit for tilting the steering column and the steering shaft, a main bracket fixed to a vehicle side bracket and a pressure applying member provided between the main bracket and the steering column for applying a pressure in one direction to the steering column.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

An embodiment of the present invention will be explained in accordance with drawings attached hereto. A steering device in the embodiment is mounted to a vehicle such as an automobile. Specifically, the steering device, employing an electric tilt steering system, includes an electric tilt unit for tilting a steering column in a vertical direction, the steering column being provided at a lower end of a vehicle steering wheel.

Figure 1:
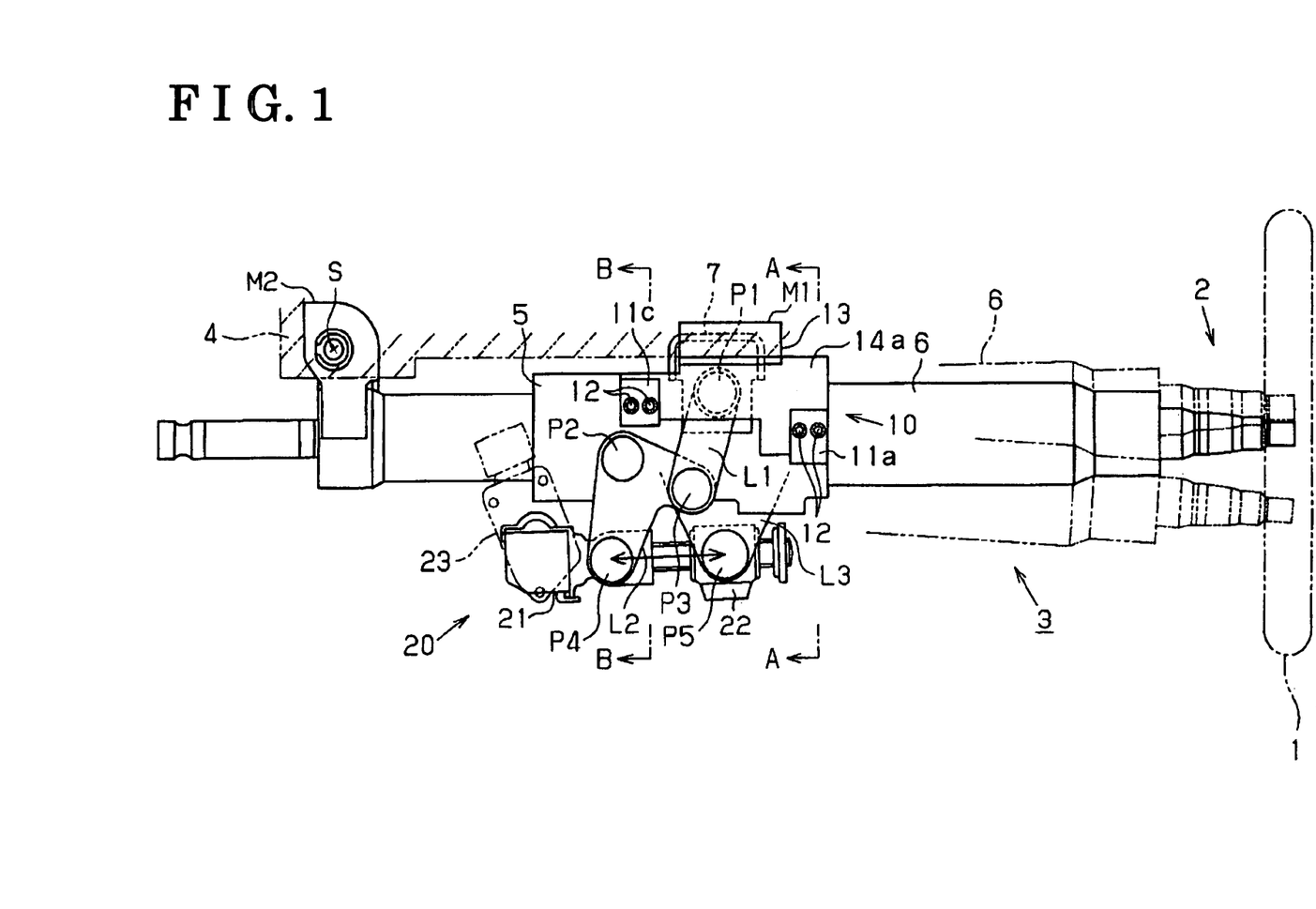
FIG. 1 illustrates a side view of a steering device according to the present embodiment.

A configuration of the steering device in this embodiment will be explained in accordance with FIG. 1, FIG. 2 A and FIG. 2 B. FIG. 1 illustrates a side view of the steering device, FIG. 2 A illustrates a cross section of the steering device in FIG. 1 along a I-I line and FIG. 2 B illustrates a cross section of the steering device in FIG. 1 along a II-II line.

As shown in FIG. 1, the steering device according to the present embodiment further includes a steering shaft 2 to which a steering wheel 1 is attached, a steering column 3 for housing and supporting the steering shaft 2 so as to be rotatable and a tilt unit 20 for tilting the steering column 3 together with the steering shaft 2.

The steering device further includes a first fixing and mounting portion M1 and a second fixing and mounting portion M2 at which the steering column 3 is fixed to the vehicle. The first fixing and mounting portion M1 is fixed to a vehicle side bracket 4 so as to form a column fixing point at which the steering column 3 is fixed to the vehicle. On the other hand, the second fixing and mounting portion M2 is also fixed to the vehicle side bracket 4 so as to form a column tilting point at which the steering column 3 can be tilted relative to the vehicle about a supporting point S (column tilting point).

The steering column 3 includes a housing 5, which serves as a case of the steering column 3, and a column tube 6, which is inserted in the housing 5 in an axial direction thereof. Further, the steering shaft 2 is inserted in the column tube 6.

The housing 5 is connected to a pair of arm members 7 by means of links L1, L2 and L3, which serve as interlocking members. Thus, the housing 5 is rotatably supported by the arm members 7 at a pivot P1 (column fixing point) so as to rotate thereabout.

The tilt unit 20 includes the links L1, L2 and L3 on the steering column 3 in order to adjust the tilt position of the steering wheel 1 by use of a drive from the tilt motor 23.

The links L1, L2 and L3 includes a first link L1, a second link L2 and a third link L3. Specifically, the first link L1 is rotatably supported by the vehicle side bracket 4 by means of the pivot P1, the second link L2 is rotatably supported by the housing 5 of the steering column 3 by means of a pivot P2, which serves as a connecting member, and the third link L3 is formed integrally with the housing 5. Further, the first link L1 is connected to the second link L2 by means of a pivot P3 serving as a connecting member, the second link L2 is connected to the tilt holder 21 by means of a pivot P4 serving as a connecting member, and the third link L3 is connected to the tilt slider 22 by means of a pivot P5 serving as a connecting member. Further, the tilt unit 20 is comprised of the tilt holder 21, which is connected to the vehicle side bracket 4 by means of the first link L1 and the second link L2, and the tilt slider 22, which is connected to the steering column 3.

The tilt holder 21 includes a driving member such as the tilt motor 23 and gears such as a worm gear, a wheel gear and a tilt worm (not shown). Specifically, when the tilt motor 23 is driven, a rotation of the tilt motor 23 transmitted to the worm gear, and this rotation further transmitted to the wheel gear, which meshes with the worm gear. Furthermore, the tilt worm is rotated integrally with the wheel gear; as a result, the rotation of the tilt worm is transmitted to the tilt slider 22.

An actuation of the tilt unit 20 for adjusting the position of the steering column 3 will be explained. The tilt unit 20 is actuated, for example, when a driver operates a switch on an instrument panel. Specifically, when the driver wants to tilt the steering column 3 in an upward direction, the tilt slider 22 is moved so as to slide in a direction where the pivot P4 is distanced from the pivot P5 in order to tilt the steering column 3 in an upward direction relative to the supporting point S.

On the other hand, when the driver wants to tilt the steering column 3 in a downward direction, the tilt slider 22 is moved so as to slide in a direction where the pivot P4 comes close the pivot P5 in order to tilt the steering column 3 in a downward direction relative to the supporting point S. The tilt unit 20 can be actuated automatically by use of a sensor which is provided on a vehicle seat for detecting that the seat has been seated by the driver.

Figure 2A:
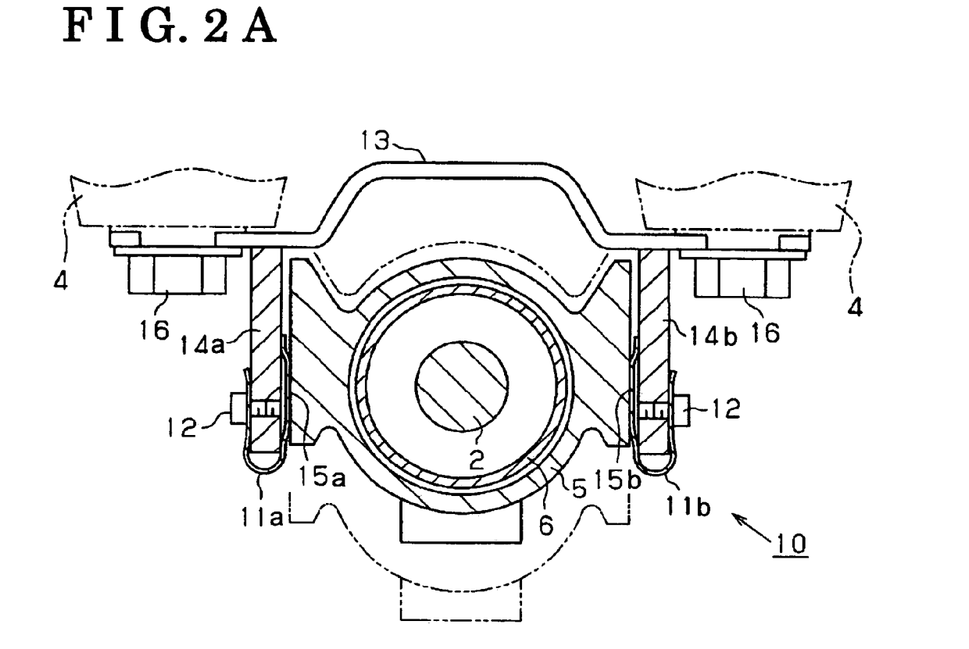
FIG. 2A illustrates a cross section of the steering device in FIG. 1 along a I-I line.
Figure 2B:
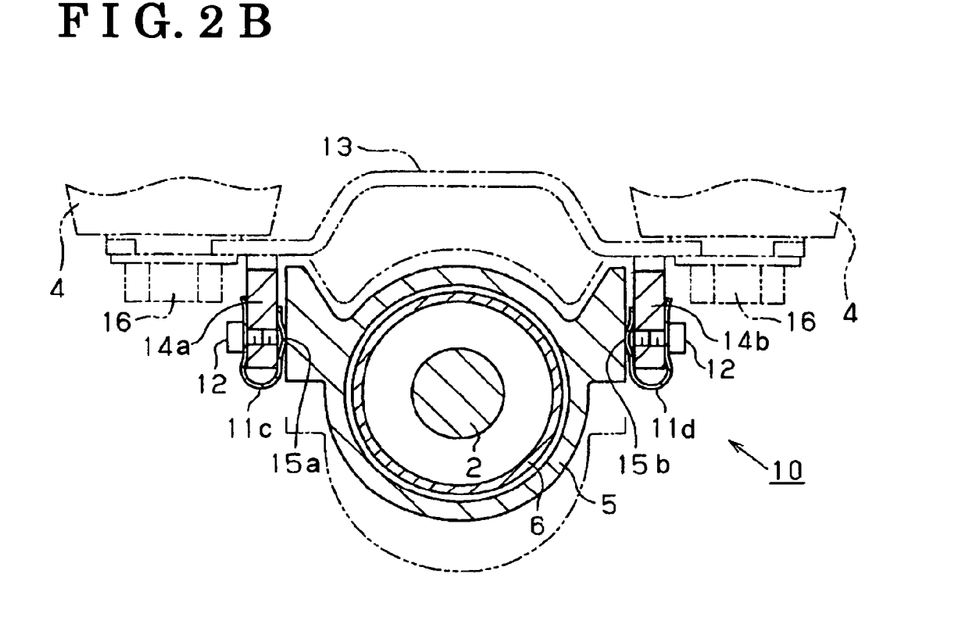
FIG. 2B illustrates a cross section of the steering device in FIG. 1 along a II-II line.

Further, as shown in FIG. 2 A and FIG. 2 B, a rigidity improving structure 10 is provided at the steering column 3, which is fixed to the vehicle side bracket 4 by use of bolts 16 through a main bracket 13, which faces the steering column 3 and includes a pair of rigid brackets 14a and 14b. The main bracket 13 is provided so as not to rotate relative to the vehicle side bracket 4 when the steering column 3 is tilted.

The pair of rigid brackets 14a and 14b is provided integrally with the main bracket 13 at a lower portion thereof by means of a welding in a manner where these rigid brackets 14a and 14b are extending in a lower direction. Specifically, as shown in FIG. 2A and FIG. 2B, the steering column 3 is supported so as to be sandwiched between the rigid brackets 14a and 14b, which are formed integrally with the main bracket 13. Further, as shown in FIG. 2A, a plate spring 11a (pressure applying member) is provided between the rigid bracket 14a and the housing 5 so as to be fixed to the rigid bracket 14a by means of a bolt 12 (fixing member), and a plate spring 11b (pressure applying member) is provided between the rigid bracket 14b and the housing 5 so as to be fixed to the rigid bracket 14b by means of a bolt 12 (fixing member). Furthermore, as shown in FIG. 2B, a plate spring 11c (pressure applying member) is provided between the rigid bracket 14a and the housing 5 so as to be fixed to the rigid bracket 14a by means of a bolt 12 (fixing member), and a plate spring 11d (pressure applying member) is provided between the rigid bracket 14b and the housing 5 so as to be fixed to the rigid bracket 14b by means of a bolt 12 (fixing member). The plate springs 11a and 11c are applying pressures to a flat surface 15a of the housing 5, and the plate springs 11b and 11d are applying pressures to a flat surface 15b of the housing 5.

Figure 3A:
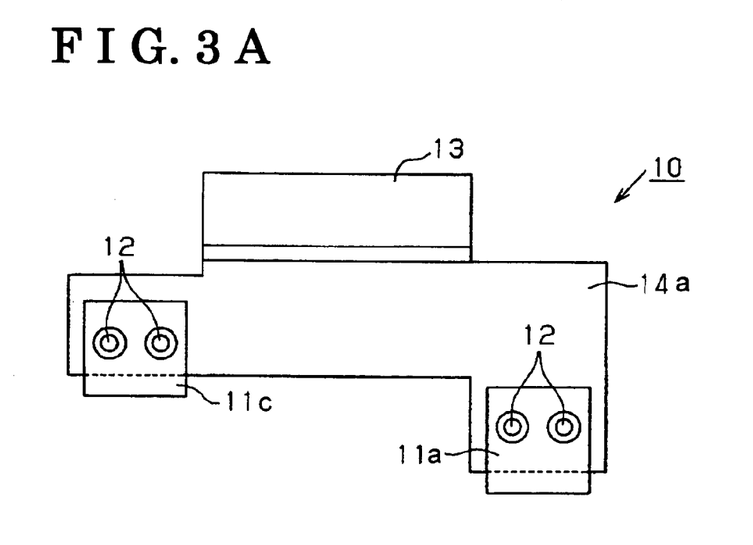
FIG. 3A illustrates an enlarged side view indicating an rigidity improving structure shown in FIG. 1.
Figure 3B:
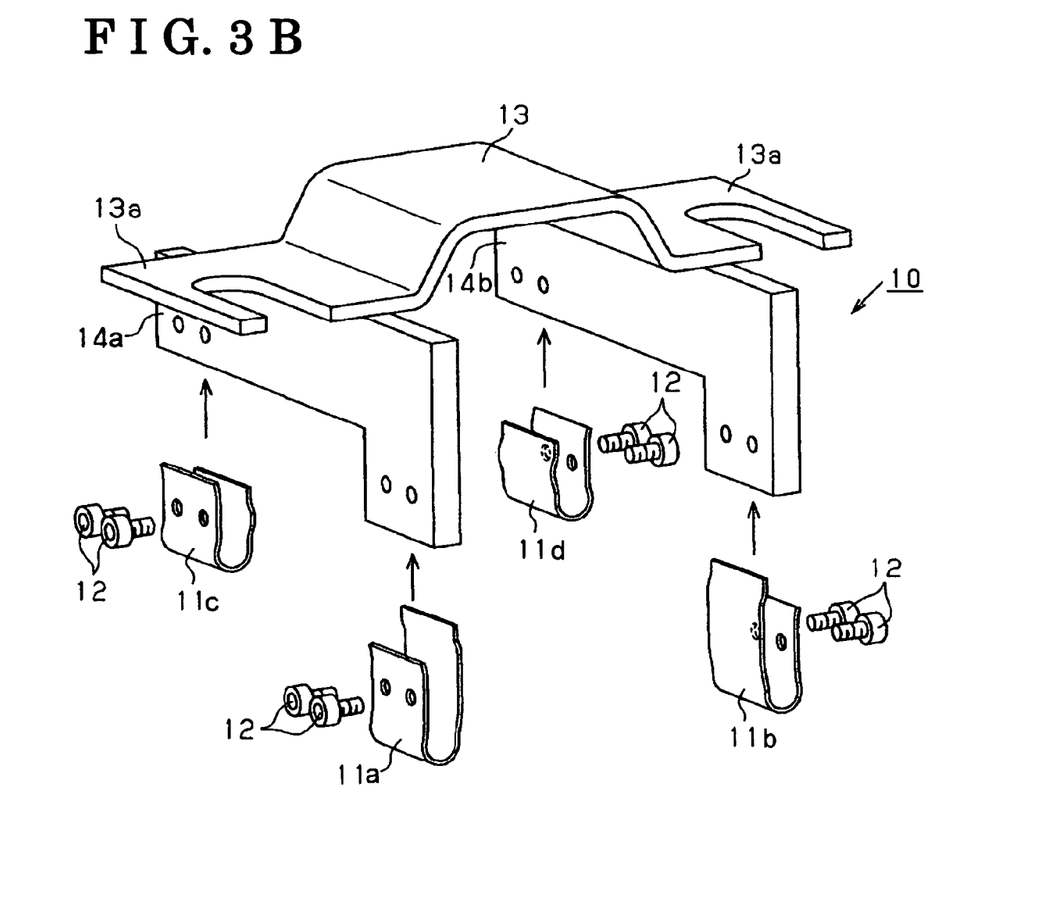
FIG. 3B illustrates an exploded perspective view of the rigidity improving structure shown in FIG. 3A.

The rigidity improving structure 10 of the steering device according to this embodiment will be further explained in accordance with FIG. 3A and FIG. 3B. FIG. 3A illustrates an enlarged side view indicating the rigidity improving structure 10 shown in FIG. 1, and FIG. 3B illustrates an exploded perspective view of the rigidity improving structure 10 shown in FIG. 3A.

A structure on the left side of the rigidity improving structure is shown in FIG. 3A, however, the same structure can be applied to the right side of the rigidity improving structure 10. As shown in FIG. 3A, the plate spring 11a is fixed to a right portion of the rigid bracket 14a by means of the bolt 12, and the plate spring 11c is fixed to a left portion of the rigid bracket 14a by means of the bolt 12. In the same manner, as shown in FIG. 3B, the plate spring 11b is fixed to a right portion of the rigid bracket 14b by means of the bolt 12, and the plate spring 11d is fixed to a left portion of the rigid bracket 14b by means of the bolt 12.

As mentioned above, the main bracket 13, which is integrally formed with the rigid brackets 14a and 14b, is screwed to the vehicle side bracket 4 at flange portions 13a of the main bracket 13 by means of the bolts 16 as shown in FIG. 2.

Using such rigidity improving structure 10, a characteristic frequency of the steering device can be enhanced. Specifically, the characteristic frequency means a frequency based on a resonance generated by the steering device, and the characteristic frequency of the steering device may be affected by weight or rigidity of the steering device. More specifically, when weight or rigidity is changed, the characteristic frequency of the steering device is also changed. Generally, when the rigidity of the steering device of the steering device is increased while the weight of the steering device is not changed, the characteristic frequency is increased, and when the rigidity of the steering device is decreased while the weight of the steering device is not changed, the characteristic frequency is decreased.

Figure 4:
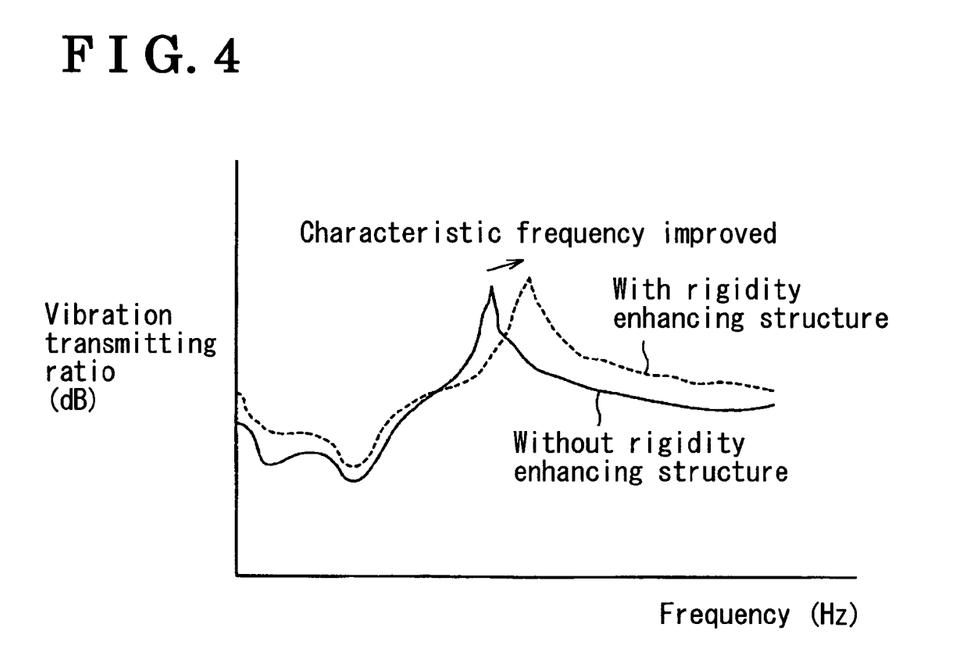
FIG. 4 illustrates differences between a characteristic frequency with the rigidity improving structure and a characteristic frequency without the rigidity improving structure.

A graph in FIG. 4 indicates differences between the characteristic frequency with the rigidity improving structure 10 and the characteristic frequency without the rigidity improving structure 10. The characteristic frequency is measured by detecting an output frequency on the steering wheel 1, which is transmitted from the front side of the steering shaft 2. A dashed line in FIG. 4 indicates the characteristic frequency with the rigidity improving structure 10 (FIG. 1), and the solid line in FIG. 4 indicates the characteristic frequency with the rigidity improving structure 10. More specifically, a horizontal axis indicates a frequency, and a vertical axis indicates a vibration transmitting ratio (output frequency/input frequency).

As shown in FIG. 4, when the rigidity improving structure 10 is used, the characteristic frequency on the steering column 3 can be enhanced. Specifically, because the steering wheel 1 is connected to the tire through the steering shaft 2 (FIG. 1) and an intermediate shaft (not shown), vibrations from an engine (not shown), which is driven, or vibrations from the tire, the vibrations being caused by roughness of a road surface while the vehicle is running, are transmitted to the steering wheel 1. Thus, it is preferable that the steering device includes a structure by which the steering wheel 1 is not vibrated sympathetically with the vibrations from the tire or the engine. The above rigidity improving structure 10 provided at the steering device can reduce vibrations on the steering wheel 1, the vibrations being generated sympathetically with the vibrations from the tire or the engine by enhancing the characteristic frequency of the steering device. Thus, the vibrations on the steering wheel 1 can be reduced, as a result, vibrations that are transmitted to the driver can be reduced.

According to the present embodiment, following effects can be obtained.

(1) According to the embodiment, the plate spring 11*a* (pressure applying member) is provided between the rigid bracket 14*a* and the housing 5 so as to be fixed to the rigid bracket 14*a* by means of the bolt 12 (fixing member), and the plate spring 11*b* (pressure applying member) is provided between the rigid bracket 14*b* and the housing 5 so as to be fixed to the rigid bracket 14*b* by means of the bolt 12 (fixing member). Furthermore, the plate spring 11*c* (pressure applying member) is provided between the rigid bracket 14*a* and the housing 5 so as to be fixed to the rigid bracket 14*a* by means of the bolt 12 (fixing member), and the plate spring 11*d* (pressure applying member) is provided between the rigid bracket 14*b* and the housing 5 so as to be fixed to the rigid bracket 14*b* by means of the bolt 12 (fixing member). The plate springs 11*a* and 11*c* are applying pressures to the flat surface 15*a* of the housing 5, and the plate springs 11*b* and 11*d* are applying pressures to the flat surface 15*b* of the housing 5. Thus, rigidity of the steering column 3 in a horizontal direction in FIG. 2 can be enhanced, and further rigidity of the steering column 3 in a vertical direction in FIG. 2 can also be enhanced together with the enhancement of the rigidity in a horizontal direction. Thus, rigidity of the steering column 3 can be enhanced in order to reduce the vibrations transmitting to the steering wheel 1.

(2) According to the embodiment, the plate springs 11*a*, 11*b*, 11*c* and 11*d* are fixed to the rigid brackets 14*a* and 14*b* by means of the bolts 12. With such a simple structure, the pressures can be preferably applied to the flat surfaces 15*a* and 15*b*, which are formed on each side of the housing 5.

(3) According to the embodiment, the above rigidity improving structure 10 provided at the steering device can reduce the vibrations on the steering wheel 1, the vibrations being generated sympathetically with the vibrations from the tire or the engine by enhancing the characteristic frequency of the steering device. Thus, the vibrations on the steering wheel can be reduced, as a result, vibrations that are transmitted to the driver can be reduced.

(4) According to the embodiment, the plate springs 11*a*, 11*b*, 11*c* and 11*d* are provided between the housing 5 of the steering column 3 and the rigid brackets 14*a* and 14*b*. Thus, because the steering column 3 is pressed in the vicinity of the steering shaft 2, to which the vibrations are transmitted, rigidity of the steering column 3 can be preferably enhanced without applying a pressure being more than requires.

An embodiment according to the present invention is not limited to the above configurations. The embodiment can be modified as follow.

According to the embodiment, the four pressure applying members are applied to the rigid brackets 14*a* and 14*b*, specifically, two pressure applying members are fixed to the rigid bracket 14*a*, which is provided on the left side of the steering column in FIG. 2A and FIG. 2B, and the other two pressure applying members are fixed to the rigid bracket 14*b*, which is provided on the right side of the steering column in FIG. 2A and FIG. 2B. However, at least one pressure applying member may be provided between the rigid bracket 14*a* or the rigid bracket 14*b* and the housing 5 and the housing 5. In other words, a configuration and a number of the pressure applying member may be vary, specifically, two pressure applying member may be provided on the rigid brackets 14*a* (left) and the rigid bracket 14*b* (right) so as to be in a pair, or the two pressure applying member may be provided only on the rigid brackets 14*a* or only on the rigid bracket 14*b*.

According to the embodiment, the plate spring 11*a* (pressure applying member) is provided to the rigid bracket 14*a*, and the plate spring 11*b* (pressure applying member) is provided to the rigid bracket 14*b*. The plate spring 11*a* and the plate spring 11*b* are provided in pairs. In addition, the plate spring 11*c* (pressure applying member) is provided to the rigid bracket 14*a* and the plate spring 11*d* (pressure applying member) is provided to the rigid bracket 14*b*. The plate spring 11*c* and he plate spring 11*c* are provided in pairs. The plate springs 11*a* and 11*c* are applying pressures to the flat surface 15*a*, and the plate springs 11*b* and 11*d* are applying pressures to the flat surface 15*b*. However, the positions of the plate springs 11*a*, 11*b*, 11*c* and 11*d* may be changed.

Between the flat surface portion 15*a* of the housing 5 and each of the plate springs 11*a* and 11*c*, and between the flat surface portion 15*b* of the housing 5 and each of the plate springs 11*a* and 11*c*, a coating such as a grease can be applied in order to make the steering column 3 to be tilted smoothly in a vertical direction.

According to the embodiment, the tilt unit 20 is actuated electrically, however, the tilt unit 20 may be actuated manually.

According to the embodiment, instead of the tilt unit 20, the steering device may includes a telescopic unit, which can adjust the column tube 6 in a longitudinal direction of the vehicle along an axial line of the column tube 6.

According to the embodiment, the plate springs 11*a* and 11*c* are fixed to the rigid bracket 14*a* by means of the bolt 12, which serves as a fixing member, and the plate springs 11*b* and 11*d* are fixed to the rigid bracket 14*b* by means of the bolt 12, which serves as a fixing member. However, the structure may be modified as follow. For example, sliding members 31, which contact to the housing 5, and coil springs 32, which serve as pressure applying members, may be attached to the rigid brackets 14a and 14b. A configuration on the rigid bracket 14b, in this modified embodiment, will be explained with reference to FIG. 5. Because the same configuration can be applied to the rigid bracket 14a, an explanation for the configuration on the rigid bracket 14a will be skipped. The sliding member 31 is attached to the rigid bracket 14b by means of a coil spring 32 and a load adjusting screw 34 (screw member) so as to be able to adjust a load applied to the rigid bracket 14b. Further, a spacer 33 is welded integrally with the rigid bracket 14b in order provide enough length thereto, into which the load adjusting screw 34 is screwed.

Figure 5:
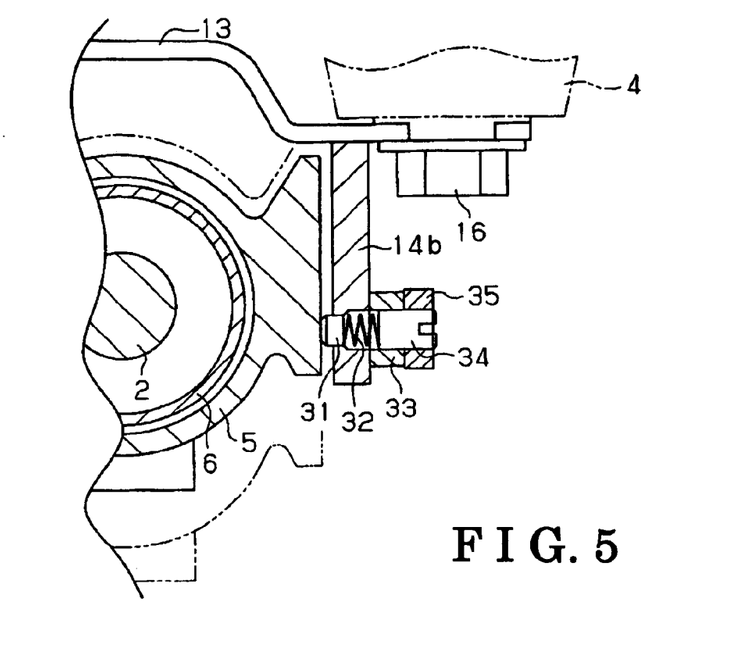
FIG. 5 illustrates a cross section of a modified embodiment of the steering device and FIG. 6 illustrates a cross section of another modified embodiment of the steering device.

Thus, the coil spring 32 applies a load, which is adjusted by the load adjusting screw 34 provided at the rigid bracket 14b, to the steering column 3, as a result, rigidity of the steering column 3 in a horizontal direction in FIG. 5 can be enhanced. After the load adjusting screw 34 is screwed in the rigid bracket 14b so as to adjust a load of the coil spring 32, the load adjusting screw 34 is maintained by means of a fixing screw 35.

Figure 6:
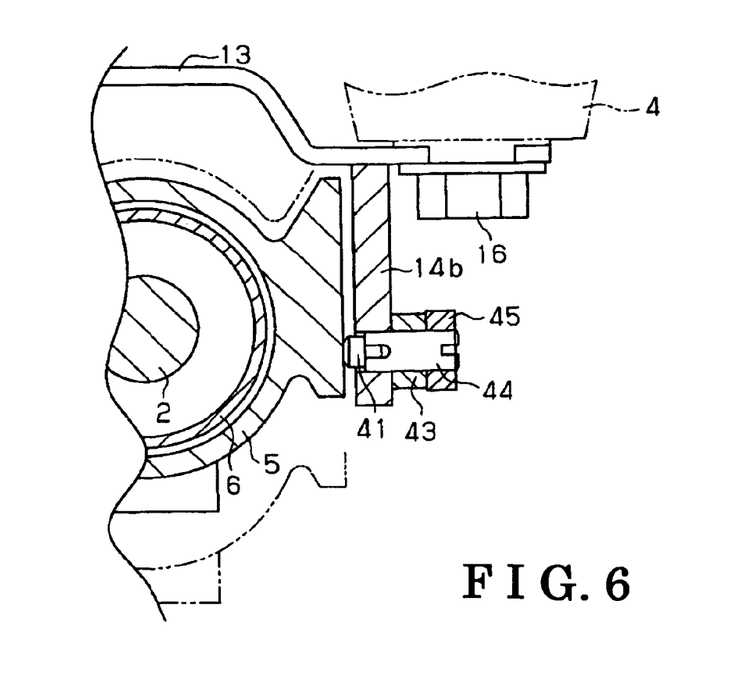

Further, the rigidity improving structure 10 and the pressure applying member may be modified as follow. For example, sliding members 41, which contact to the housing 5, and adjusting screws 44, which serve as pressure applying members, may be attached to the rigid brackets 14a and 14b. A configuration on the rigid bracket 14b, in this modified embodiment, will be explained with reference to FIG. 6. Because the same configuration can be applied to the rigid bracket 14a, an explanation for the configuration on the rigid bracket 14a will be skipped.

The sliding member 41 is attached to the rigid bracket 14b by means of the adjusting screw 44 so as to be able to adjust a torque or a load applied to the rigid bracket 14b. Further, a spacer 43 is welded integrally with the rigid bracket 14b in order provide enough length thereto, into which the adjusting screw 44 is screwed. By adjusting the position of the adjusting screw 44, to which the sliding member 41 is press fit, the pressure applied to the steering column 3 can be adjusted. Thus, rigidity of the steering column 3 in a horizontal direction in FIG. 6 can be enhanced. After the load adjusting screw 44 is screwed in the rigid bracket 14b, the load adjusting screw 44 is maintained by means of a fixing screw 45. Same effects can be obtained in these modified embodiments shown in FIG. 4 and FIG. 5.

According to the embodiment, the pressure applying members are fixed to the rigid brackets 14a and 14b, which are formed integrally with the main bracket, the main bracket 13 being fixed to the vehicle side bracket 4. The position of the pressure applying members may be changed to any place between the column tilting point (supporting point S) and the steering wheel 1. For example, when the steering column 3 is fixed at a lower end thereof, and a column tilting point in this configuration is positioned nearer to the steering wheel 1 than the column tilting point in the embodiment, same effect as in the embodiment can be obtained. Thus, vibrations on the steering column 3 can be reduced preferably.

According to the embodiment, the pressure applying member is provided between the rigid bracket 14a or 14b and the housing 5. However, the pressure applying member may be provided between the main bracket 13 and the steering column 3 (except a portion at which the housing 5 is attached). In this configuration, same effects as in the embodiment can be obtained.

According to the embodiment, the steering column 3 includes the rigidity improving structure 10, the main bracket 13, and the rigid brackets 14a and 14b, however, the rigidity improving structure 10 may be formed integrally with, for example, the vehicle side bracket 4. In this configuration, the rigidity improving structure 10 may include a supporting member facing the steering column and supporting the steering column so as to be sandwiched between the rigid brackets 14a and 14b, and a pressure applying member, which is provided between the supporting member and the steering column so as to apply a pressure to the steering column in one direction.

According to the present invention, the pressure applying member provided between the main bracket and the steering column for applying a pressure to the steering column in one direction, in other words, for applying a pressure to the steering column from the main bracket. Thus, rigidity of the steering column in a horizontal direction can be enhanced, and rigidity of the steering column in a vertical direction also be enhanced together with the enhancement of the rigidity in a horizontal direction. Thus, rigidity of the steering column can be enhanced, as a result, the vibrations transmitting to the steering wheel can be reduced.

According to the present invention, the pressure applying member is provided between the column tilting point and the steering wheel. Thus, because the pressure applying member is provided at a portion where the vibrations are transmitted, the vibrations on the steering column can be reduced preferably.

According to the present invention, the plate spring serving as the pressure applying member is fixed to the rigid bracket by means of the screwing member. Thus, with such a simple structure, the pressure can be preferably applied to the side surface of the steering column.

According to the present invention, a level of the load applied to the steering column by the sliding member can be adjustable by means of the coil spring and the screw member. Thus, the level of the load applied to the side of the steering column from the rigid bracket side can be adjusted.

According to the present invention, a level of the load applied to the steering column by the sliding member can be adjustable by means of the adjusting screw, which is serving as a pressure applying member. Thus, the level of the load applied to the side of the steering column from the rigid bracket side can be adjusted.

According to the present invention, the steering device comprises the steering shaft to which the steering wheel is attached, the steering column for housing and supporting the steering shaft so as to be rotatable, the tilt unit for tilting the steering column and the steering shaft, the supporting member sandwiching the steering column in order to support it and the pressure applying member provided between the supporting member and the steering column for applying a pressure in one direction to the steering column. Thus, rigidity of the steering column in a horizontal direction can be enhanced, and rigidity of the steering column in a vertical direction also be enhanced together with the enhancement of the rigidity in a horizontal direction. Thus, rigidity of the steering column can be enhanced, as a result, the vibrations transmitting to the steering wheel can be reduced.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A steering device comprising:
    a steering shaft to which a steering wheel is attached;
    a steering column for housing and supporting the steering shaft so as to be rotatable;
    a tilt unit for tilting the steering column and the steering shaft;
    a main bracket adapted to be fixed to a vehicle body; and
    a pressure applying member provided between the main bracket and the steering column for applying a pressure in one direction to the steering column, the pressure applying member including a plate spring fixed to the main bracket via a fixing member;
    wherein the main bracket includes a pair of rigid brackets which face each other through the steering column and are adapted to extend in a lower direction of the vehicle, and the pressure applying member is comprised of a first and second pressure applying members fixed respectively to each one of the pair of the rigid brackets of the main bracket.

2. A steering device according to claim 1 further comprising:
    a column fixing point at which the steering column is supported;
    a column tilting point at which the steering column is pivotally supported, wherein the pressure applying member is provided between the column tilting point and the steering wheel.

3. A steering device according to claim 1, wherein the steering column comprises a housing having two flat portions formed in pairs, each of the flat portions facing each of the rigid brackets, and a column tube provided in the housing; and the first pressure applying member is provided between one of the rigid brackets and one of the flat portions of the housing, and the second pressure applying member is provided between the other of the rigid brackets and the other of the flat portions of the housing.

4. A steering device according to claim 1, wherein the plate spring is fixed to the main bracket such that one end portion of the plate spring is free.

5. A steering device according to claim 1, wherein the plate spring is u-shaped.

6. A steering device comprising:
    a steering shaft to which a steering wheel is attached;
    a steering column for housing and supporting the steering shaft so as to be rotatable;
    a tilt unit for tilting the steering column and the steering shaft;
    a supporting member adapted to be fixed to a vehicle body and sandwiching the steering column in order to support the steering column; and
    a pressure applying member provided between the supporting member and the steering column for applying a pressure in one direction to the steering column, the pressure applying member including a plate spring fixed to the supporting member;
    wherein the supporting member includes two rigid brackets provided in pairs in a manner where the rigid brackets face each other through the steering column and are adapted to extend in a lower direction of the vehicle, and the pressure applying member is comprised of a first and second pressure applying members fixed respectively to each one of the pair of the rigid brackets of the main bracket.

7. A steering device according to claim 6, wherein the plate spring is fixed to the supporting member such that one end portion of the plate spring is free.

8. A steering device according to claim 6, wherein the plate spring is u-shaped.

9. A steering device comprising:
    a steering shaft to which a steering wheel is attached;
    a steering column for housing and supporting the steering shaft so as to be rotatable;
    a tilt unit for tilting the steering column and the steering shaft;
    a pair of rigid brackets adapted to be fixed to a vehicle body and provided so as to face each other through the steering column;
    a first pressure applying member provided between one of the rigid brackets and the steering column for applying a pressure in a first direction to the steering column; and
    a second pressure applying member provided between the other of the rigid brackets and the steering column for applying a pressure in a second direction opposing to the first direction to the steering column, each of the first and second pressure applying members including a plate spring fixed to respective ones of the rigid brackets.

10. A steering device according to claim 9 further comprising: a column fixing point at which the steering column is supported; a column tilting point at which the steering column is pivotally supported, wherein the pressure applying member is provided between the column tilting point and the steering wheel.

11. A steering device according to claim 9, wherein each plate spring is fixed to one of the rigid brackets such that one end portion of the plate spring is free.

12. A steering device according to claim 9, wherein the plate spring is u-shaped.

* * * * *